US005851684A

United States Patent [19]

[11] Patent Number: 5,851,684
[45] Date of Patent: Dec. 22, 1998

Matscheko et al.

[54] DECORATIVE SHEETS USED IN THE PRODUCTION OF LAMINATED PANELS

[75] Inventors: Horst Matscheko, Karlsruhe; Stefan Zachert, Neustadt, both of Germany

[73] Assignee: Arjo Wiggins Deutschland GmbH, Ettlingen, Germany

[21] Appl. No.: 746,917

[22] Filed: Nov. 18, 1996

Related U.S. Application Data

[63] Continuation of Ser. No. 351,402, filed as PCT/EP93/01549 Jun. 17, 1993, abandoned.

[30] Foreign Application Priority Data

Jun. 22, 1992 [FR] France .................................. 92 07558

[51] Int. Cl.$^{6}$ ..................................................... B32B 29/00

[52] U.S. Cl. ....................... 428/537.5; 428/290; 428/511; 428/514; 428/195; 427/388.4; 524/22; 524/47; 524/503; 524/522; 524/524; 524/557

[58] Field of Search ............................... 524/503, 22, 47, 524/522, 524, 557; 428/290, 511, 514, 195, 537.5; 427/388.4

[56] References Cited

U.S. PATENT DOCUMENTS

| | | | |
|---|---|---|---|
| 3,720,562 | 3/1973 | Drelich | 156/291 |
| 4,229,523 | 10/1980 | Ohta et al. | 430/532 |
| 4,301,017 | 11/1981 | Kightlinger et al. | 252/8.6 |
| 4,375,535 | 3/1983 | Kightlinger et al. | 527/313 |
| 5,374,679 | 12/1994 | Nosaka et al. | 525/56 |

OTHER PUBLICATIONS

Patent Abstracts of Japan, vol. 4, No. 16 (C–72), Feb. 1980.

*Primary Examiner*—Marion McCamish
*Assistant Examiner*—John J. Guarriello
*Attorney, Agent, or Firm*—Bacon & Thomas

[57] ABSTRACT

A novel aqueous sheet-impregnating composition including a composition of a styrene-ethyl acrylate-butyl acrylate copolymer and a binder. The binder is selected from polyvinyl alcohol, polyvinyl acetate, gelatin and starch, and the composition includes 5–90 parts by weight of a polyvinyl alcohol solution and 10–95 parts by weight of a styrene-ethyl acrylate-butyl acrylate copolymer dispersion. A decorative sheet for laminates may thereby be obtained.

25 Claims, No Drawings

DECORATIVE SHEETS USED IN THE PRODUCTION OF LAMINATED PANELS

This application is a Continuation of application Ser. No. 08/351,402, filed as PCT/EP93/01549 Jun. 17, 1993 now abandoned.

The invention relates to a novel composition for impregnating decorative sheets which are usable in the production of laminated panels.

Several kinds of laminated panels are known to exist: so-called high pressure panels, low-pressure panels and panels comprising an adhesive-coated sheet of paper.

For many years, laminates have been used as materials in dwellings and commercial and industrial buildings. Typical applications of such laminates are for covering wall surfaces, table tops, furniture and the like.

So-called high pressure laminates are produced from a core constituted of resin-impregnated sheets. The sheets are generally sheets of kraft paper which have been impregnated with a thermosetting resin.

Once the kraft paper has been impregnated with resin, the sheets are dried, cut and stacked one over the other. The number of sheets in the stack is dependent on the applications and can vary between 3 and 9, it can even be higher.

Then a decorative sheet is placed over the stack of sheets constituting the core, said decorative sheet being generally a sheet of paper carrying a printed pattern or being light colored, impregnated with a thermosetting resin which does not blacken under heat, for example melamine formaldehyde resins, benzoguanamine formaldehyde resins, unsaturated polyester resins.

During densification, the thermosetting resins are converted into thermoset form and the material obtained is extremely hard and has a decorative effect.

Low pressure laminates are produced in the same way as the high pressure ones, except that the laminating of the decorative sheet is effected directly onto a panel of wood particles or any other supporting base.

The third type of laminated panel is constituted by a panel of agglomerated wood particles on which is placed a pre-impregnated sheet of paper, said sheet being bonded to the panel by adhesive means. The sheet of paper may be of uniform color or comprise decorative patterns. Generally, said decorative patterns are obtained by printing over the pre-impregnated sheet. The invention is concerned with pre-impregnated sheets for this third type of laminated panels.

Conventionally, the compositions for impregnating decorative sheets are aqueous dispersions containing styrene-ethyl acrylate-butyl acrylate copolymer and an aqueous solution of melamine formaldehyde resin. However, these compositions present a great disadvantage. Indeed, during handling of the sheet of paper, there is a release of formol which is due to the presence of formaldehyde. This formol is dangerous to the health.

A first problem to be solved is therefore that of providing a composition for impregnating decorative sheets for laminates, which composition contains no formaldehyde.

Generally, impregnated sheets are sold to printers who print the decorative patterns on them. Therefore, it is important for the impregnated sheets to be able to resist tearing.

Said sheets also have to resist changes of climate, namely alterations in the ambient temperature and in the degree of hygrometry of the air. Said sheet should also be readily printable and the printing obtained should be adequate.

Therefore it is another object of the invention to provide a formaldehyde-free impregnating composition which confers to the impregnated sheet both good resistance to tearing and good printability as well as good storing stability.

Another object of the invention is to provide pre-impregnated sheets which are flexible so that they can be rolled up.

The novel impregnating composition according to the invention is such that the melamine formaldehyde resin is eliminated and replaced by an aqueous composition of a binder selected among polyvinyl alcohol, polyvinyl acetate, gelatin, starch. Preferably, an aqueous solution of polyvinyl alcohol is used, and more preferably of polyvinyl alcohol at 10%.

The pH of the impregnating solution is adjusted to between 5.0 and 7.0. The viscosity of said composition is adjusted to between 44.1 mPa and 58.8 m.P.a.s.

The invention is remarkable in that, although polyvinyl alcohol is known to the man skilled in the art as conferring good cohesion to the paper, the man skilled in the art expects that the polyvinyl alcohol, which shows a certain amount of solubility in water, will not confer any wet strength. Yet, surprisingly, polyvinyl alcohol does confer a wet strength to the sheet.

The novel composition according to the invention is such that it comprises:

between 5 and 90 parts by weight of a solution of polyvinyl alcohol at 5 to 15%, between 10 and 95 parts by weight of a styrene-ethyl acrylate-butyl acrylate copolymer dispersion.

Preferably, the composition comprises:

50 parts by weight of a polyvinyl alcohol solution at between 5 and 15%, 50 parts by weight of a styrene-ethyl acrylate-butyl acrylate copolymer dispersion.

Unexpectedly, the sheet impregnated with such a composition enables the continuous impregnation of a sheet of paper, said sheet showing good resistance to tearing, good printability and good storage resistance.

The invention further relates to a sheet of paper impregnated with such a composition.

The following description, given with reference to the non-restrictive accompanying examples included by way of reference and non-restrictively, will explain how the invention can be implemented.

EXAMPLE 1

A sheet of paper is produced from an aqueous dispersion of cellulose fibers, binder and compounds normally used in the papermaking industry. Said dispersion is placed on the wire of a Fourdrinier type papermaking machine, and drained and the resulting sheet is dried. The sheet obtained has a basis weight of 66 g/m$^2$.

50 parts by weight of an aqueous dispersion of a styrene-ethyl acrylate-butyl acrylate copolymer sold by the company BASF under the name ACRONAL are mixed with 50 parts by weight of a polyvinyl alcohol solution at 10%. The composition has a pH ranging between 5.0 and 7.0 and its viscosity is between 44.1 m.Pa.s and 58.8 m.Pa.s. The sheet of paper is impregnated with said composition in a size-press and dried. The impregnated sheet thus obtained has a basic weight of 80 g/m$^2$.

The quantity of formaldehyde which is liable to be released from the sheet is measured as follows: the pre-impregnated sheet is placed inside an enclosure through which a stream of air is caused to flow, and the exhaust air is washed. The quantity in mg of formaldehyde released per hour and per square meter of the sheet is measured. The quantity of formaldehyde is less than 0.15 mg per hour and per square meter.

The internal cohesion of the sheet is measured by pulling off with "Scotch" (trademark filed by 3M). Such measurement is carried out as follows:

The sample is subjected for 2 mins to a temperature of 150° C. A double-faced "scotch" is applied on a glass plate and a strip cut in the paper feed direction or crosswise, is applied with pressure thereon. A strip of "Scotch" is placed on the strip of paper and the end of the strip of "Scotch" is applied on an 80 mm high trestle.

The assembly is allowed to rest for 1 minute for a short test, for 24 hours for a long test and for a climate test, and in the case of a closed enclosure, for 24 hours at 40° C., in a relative humidity of 90 %.

After the rest period, the Scotch is pulled off the sample.

The strip of "Scotch" is applied on a white or black cardboard depending on the color of the sample. It is possible to see with the naked eye whether or not the sample has been torn off by the "Scotch".

The test shows that the sample has resisted the pulling off action and has a good internal cohesion in the three tests.

EXAMPLE 2

The sheet of paper produced according to Example 1 is impregnated with a composition containing 90 parts by weight of a solution at 10% of polyvinyl alcohol and 10 parts of styrene-ethyl acrylate-butyl acrylate copolymer.

The sample does not withstand the pulling-off test after steam drying. Therefore it shows no resistance to climate conditions.

EXAMPLE 3

Example 1 is repeated, except that the sheet of paper is impregnated with a composition containing 25 parts by weight of a solution at 15% of polyvinyl alcohol and 75 parts by weight of styrene-ethyl acrylate-butyl acrylate copolymer.

The sample withstands the three pulling-off tests.

What is claimed is:

1. A method for manufacturing an impregnated sheet for use in decorative laminates, comprising impregnating a sheet of paper with an aqueous composition substantially free of melamine formaldehyde resin and comprising a styrene-ethyl acrylate-butyl acrylate copolymer and a binder to form an impregnated sheet, and drying said impregnated sheet, wherein less than 0.15 mg of formaldehyde is released by the dried impregnated sheet per hour and per square meter.

2. The method of claim 1, wherein the sheet of paper is impregnated with an aqueous composition wherein the binder is selected from the group consisting of polyvinyl alcohol, gelatin and starch.

3. The method of claim 1, wherein the sheet of paper is impregnated with an aqueous composition comprising:

between 5 and 90 parts by weight of a polyvinyl alcohol solution, and between 10 and 95 parts by weight of a styrene-ethyl acrylate-butyl acrylate copolymer dispersion.

4. The method of claim 1, wherein the sheet of paper is impregnated with an aqueous composition comprising:

about 50 parts by weight of a polyvinyl alcohol solution comprising 5 to 15% polyvinyl alcohol, and about 50 parts by weight of a styrene-ethyl acrylate-butyl acrylate copolymer dispersion.

5. The method of claim 1, wherein the sheet of paper is impregnated with an aqueous composition comprising:

about 25 parts by weight of a polyvinyl alcohol solution comprising about 15% polyvinyl alcohol, and about 75 parts by weight of a styrene-ethyl acrylate-butyl acrylate copolymer dispersion.

6. The method of claim 3, wherein the sheet of paper is impregnated with an aqueous composition wherein the polyvinyl alcohol solution comprises 5 to 15% polyvinyl alcohol.

7. The method of claim 6, wherein the sheet of paper is impregnated with an aqueous composition wherein the polyvinyl alcohol solution comprises about 10% polyvinyl alcohol.

8. The method of claim 1, wherein the sheet of paper is impregnated with an aqueous composition having a pH in the range of 5.0 to 7.0.

9. The method of claim 1, wherein the sheet of paper is impregnated with an aqueous composition having a viscosity in the range of 44.1 m.Pa.s to 58.8 m.Pa.s.

10. The method of claim 2, wherein the sheet of paper is impregnated with an aqueous composition having a pH in the range of 5.0 to 7.0.

11. The method of claim 2, wherein the sheet of paper is impregnated with an aqueous composition having a viscosity in the range of 44.1 m.Pa.s to 58.8 m.Pa.s.

12. The method of claim 1, further comprising a step of drying the impregnated sheet.

13. The method of claim 4, further comprising a step of drying the impregnated sheet.

14. A process for manufacturing an impregnated decorative paper sheet designed to be applied on a supporting base by adhesive means so as to form a decorative panel, wherein a decorative paper sheet is impregnated with an aqueous composition comprising a styrene-ethyl acrylate-butyl acrylate copolymer and a binder to form an impregnated sheet, and drying said impregnated sheet, wherein less than 0.15 mg of formaldehyde is released by the dried impregnated sheet per hour and per square meter.

15. The process of claim 14, wherein the binder is selected from the group consisting of polyvinyl alcohol, gelatin and starch.

16. A dried impregnated sheet for use in decorative laminates comprising a sheet of paper impregnated with an aqueous composition substantially free of melamine formaldehyde resin, said composition comprising a styrene-ethyl acrylate-butyl acrylate copolymer and a binder wherein the impregnated sheet is dried, and wherein less than 0.15 mg of formaldehyde is released by the dried impregnated sheet per hour and per square meter.

17. The impregnated sheet of claim 16, wherein the binder is selected from the group consisting of polyvinyl alcohol, gelatin and starch.

18. The impregnated sheet of claim 17, wherein the aqueous composition comprises:

between 5 and 90 parts by weight of a polyvinyl alcohol solution, and between 10 and 95 parts by weight of a styrene-ethyl acrylate-butyl acrylate copolymer dispersion.

19. The impregnated sheet of claim 16, wherein the polyvinyl alcohol solution comprises 5 to 15% polyvinyl alcohol.

20. The impregnated sheet of claim 18, wherein the aqueous composition comprises:

about 50 parts by weight of a polyvinyl alcohol solution comprising 5 to 15% polyvinyl alcohol, and about 50 parts by weight of a styrene-ethyl acrylate-butyl acrylate copolymer dispersion.

21. A decorative laminate comprising the impregnated sheet according to claim 16.

22. A decorative laminate comprising the impregnated sheet according to claim 17.

23. A decorative laminate comprising the impregnated sheet according to claim 18.

24. A decorative laminate comprising the impregnated sheet according to claim 19.

25. A decorative laminate comprising the impregnated sheet according to claim 20.

* * * * *